(12) United States Patent
Knapp

(10) Patent No.: US 8,801,049 B2
(45) Date of Patent: Aug. 12, 2014

(54) PIPE COUPLING SYSTEM AND METHOD

(75) Inventor: Mark Knapp, Ravenna, OH (US)

(73) Assignee: Springseal, Inc., Streetsboro, OH (US)

( * ) Notice: Subject to any disclaimer, the term of this patent is extended or adjusted under 35 U.S.C. 154(b) by 0 days.

(21) Appl. No.: 13/458,674

(22) Filed: Apr. 27, 2012

(65) Prior Publication Data

US 2012/0274065 A1 Nov. 1, 2012

Related U.S. Application Data

(60) Provisional application No. 61/480,748, filed on Apr. 29, 2011.

(51) Int. Cl.
*F16L 21/02* (2006.01)
*F16L 17/025* (2006.01)
*F16L 25/00* (2006.01)
*F16L 25/12* (2006.01)

(52) U.S. Cl.
CPC ........... *F16L 25/0036* (2013.01); *F16L 17/025* (2013.01); *F16L 25/0054* (2013.01); *F16L 25/12* (2013.01); *Y10S 285/903* (2013.01)
USPC .......................................... 285/369; 285/903

(58) Field of Classification Search
USPC .................................. 285/903, 369
See application file for complete search history.

(56) References Cited

U.S. PATENT DOCUMENTS

| | | | | |
|---|---|---|---|---|
| 442,837 A * | 12/1890 | Ward | ............................ | 285/319 |
| 2,201,372 A | 5/1940 | Miller | | |
| 2,230,725 A | 2/1941 | Nathan | | |
| 2,259,940 A | 10/1941 | Nathan | | |
| 2,578,933 A | 12/1951 | Hunter et al. | | |
| 2,887,328 A * | 5/1959 | Risley et al. | ................... | 285/369 |
| 2,926,028 A * | 2/1960 | Hookings et al. | ............. | 285/369 |
| 2,953,398 A | 9/1960 | Haugen et al. | | |
| 2,980,449 A * | 4/1961 | Dunton | ......................... | 285/369 |
| 3,031,200 A | 4/1962 | Hamer | | |
| 3,081,102 A | 3/1963 | Murray et al. | | |

(Continued)

FOREIGN PATENT DOCUMENTS

| | | |
|---|---|---|
| CH | 643644 | 6/1984 |
| DE | 3113320 | 2/1982 |

(Continued)

OTHER PUBLICATIONS

One page advertisement entitled "No-Hub Couplings", print out from Fernco Inc. web site on Dec. 1, 2009. http://www.fernco.com/plumbing/shielded-couplings/no-hub-couplings.

(Continued)

*Primary Examiner* — David E Bochna
(74) *Attorney, Agent, or Firm* — Tarolli, Sundheim, Covell & Tummino LLP

(57) ABSTRACT

A coupler assembly for use with a pipe or piping sections comprising a unitary annular body, forming first and second cylindrical openings for surrounding a pipe or piping sections to facilitate forming a fluid-tight seal therein. The unitary annular body comprises a medial portion and first and second longitudinal portions integrally connected to opposite ends of the medial portion. Extending from the first and second longitudinal portions away from the medial portion are respective first and second locking arrangements for securing the coupler assembly to a pipe or piping sections.

19 Claims, 9 Drawing Sheets

(56) References Cited

U.S. PATENT DOCUMENTS

| | | | |
|---|---|---|---|
| 3,118,682 A | 1/1964 | Fredd | |
| 3,368,830 A | 2/1968 | French | |
| 3,380,763 A * | 4/1968 | Schmunk | 285/369 |
| 3,386,745 A | 6/1968 | Hein | |
| 3,389,923 A * | 6/1968 | Love, Jr. et al. | 285/369 |
| 3,390,890 A | 7/1968 | Kurtz | |
| 3,445,120 A | 5/1969 | Barr | |
| 3,469,854 A | 9/1969 | Linwood | |
| 3,516,693 A * | 6/1970 | Glover | 285/369 |
| 3,529,854 A | 9/1970 | Thomas | |
| 3,695,639 A | 10/1972 | Shire et al. | |
| 3,695,643 A * | 10/1972 | Schmunk | 285/903 |
| 3,727,953 A * | 4/1973 | Martin et al. | 285/903 |
| 3,796,447 A * | 3/1974 | De Putter | 285/903 |
| 3,813,107 A | 5/1974 | Ditcher | |
| 3,825,288 A * | 7/1974 | Maroschak | 285/903 |
| 3,856,315 A | 12/1974 | Stansbury | |
| 3,857,589 A * | 12/1974 | Oostenbrink | 285/379 |
| 3,861,721 A | 1/1975 | Berghofer | |
| 3,865,386 A | 2/1975 | Wilke | |
| 3,887,674 A | 6/1975 | Oostenbrink | |
| 3,899,198 A * | 8/1975 | Maroschak | 285/903 |
| 3,938,834 A * | 2/1976 | Oostenbrink | 285/235 |
| 3,955,834 A | 5/1976 | Ahlrot | |
| 4,018,461 A | 4/1977 | Bram | |
| 4,036,513 A | 7/1977 | Loftus et al. | |
| 4,059,293 A | 11/1977 | Sipler | |
| 4,073,514 A * | 2/1978 | Pate | 285/149.1 |
| 4,097,074 A | 6/1978 | Nagao et al. | |
| 4,126,339 A * | 11/1978 | Thompson | 285/369 |
| 4,140,742 A | 2/1979 | Fischer | |
| 4,141,576 A | 2/1979 | Lupke et al. | |
| 4,173,362 A | 11/1979 | Glover et al. | |
| 4,174,985 A | 11/1979 | Buidry | |
| 4,188,040 A | 2/1980 | Wolf et al. | |
| 4,223,895 A | 9/1980 | Roberts, Jr. et al. | |
| 4,298,206 A | 11/1981 | Kojima | |
| 4,333,662 A | 6/1982 | Jones | |
| 4,365,818 A | 12/1982 | Tolliver | |
| 4,371,179 A | 2/1983 | Bohman | |
| 4,387,900 A | 6/1983 | Ditcher et al. | |
| 4,394,024 A | 7/1983 | Delhaes | |
| 4,395,159 A | 7/1983 | Karuks et al. | |
| 4,468,367 A * | 8/1984 | Beune et al. | 264/255 |
| 4,487,421 A | 12/1984 | Housas et al. | |
| 4,518,177 A | 5/1985 | Deakins | |
| 4,538,837 A | 9/1985 | Cronk | |
| 4,552,914 A | 11/1985 | Sterling | |
| 4,564,220 A | 1/1986 | Sills et al. | |
| 4,566,704 A | 1/1986 | van Dongeren | |
| 4,575,128 A | 3/1986 | Sundquist | |
| 4,585,026 A | 4/1986 | Norton | |
| 4,602,792 A | 7/1986 | Andrick | |
| 4,602,793 A | 7/1986 | Andrick | |
| 4,630,848 A | 12/1986 | Twist et al. | |
| 4,641,858 A | 2/1987 | Roux | |
| 4,642,269 A | 2/1987 | Kohyama et al. | |
| 4,702,502 A | 10/1987 | Shade et al. | |
| 4,711,474 A | 12/1987 | Patrick | |
| 4,743,422 A | 5/1988 | Kalriis-Nielsen et al. | |
| 4,772,154 A | 9/1988 | Caroulle | |
| 4,795,166 A | 1/1989 | Irmler | |
| 4,818,209 A | 4/1989 | Petersson et al. | |
| 4,826,028 A | 5/1989 | Vassallo et al. | |
| 4,834,398 A | 5/1989 | Guzowski et al. | |
| 4,946,206 A | 8/1990 | Roe et al. | |
| 4,969,653 A | 11/1990 | Breen | |
| 5,013,052 A | 5/1991 | Butler et al. | |
| 5,039,137 A | 8/1991 | Cankovic et al. | |
| 5,045,635 A | 9/1991 | Kaplo et al. | |
| 5,058,907 A | 10/1991 | Percebois et al. | |
| 5,064,207 A | 11/1991 | Bengtsson | |
| 5,067,751 A | 11/1991 | Walworth et al. | |
| 5,106,129 A | 4/1992 | Camacho et al. | |
| 5,114,162 A | 5/1992 | Ditcher | |
| 5,143,381 A | 9/1992 | Temple | |
| 5,163,717 A | 11/1992 | Wise | |
| 5,169,161 A | 12/1992 | Jones | |
| 5,180,196 A | 1/1993 | Skinner | |
| 5,288,087 A | 2/1994 | Bertoldo | |
| 5,324,083 A | 6/1994 | Vogelsang | |
| 5,326,138 A * | 7/1994 | Claes et al. | 285/110 |
| 5,346,662 A | 9/1994 | Black et al. | |
| 5,360,851 A | 11/1994 | Feder et al. | |
| 5,407,236 A | 4/1995 | Schwarz et al. | |
| 5,415,436 A * | 5/1995 | Claes et al. | 285/110 |
| 5,431,458 A | 7/1995 | Schaub et al. | |
| 5,542,717 A | 8/1996 | Rea et al. | |
| 5,566,955 A | 10/1996 | Preisendoerfer | |
| 5,573,279 A | 11/1996 | Rea et al. | |
| 5,577,741 A | 11/1996 | Sink | |
| 5,603,532 A | 2/1997 | Guest | |
| 5,626,349 A | 5/1997 | Sutherland et al. | |
| 5,679,303 A | 10/1997 | Hayashi et al. | |
| 5,687,976 A | 11/1997 | Andrick et al. | |
| 5,733,491 A | 3/1998 | Grosset et al. | |
| 5,735,528 A | 4/1998 | Olsson | |
| 5,765,880 A * | 6/1998 | Goddard | 285/231 |
| 5,806,593 A | 9/1998 | Surles | |
| 5,813,705 A | 9/1998 | Dole | |
| 5,887,909 A * | 3/1999 | Tokuda | 285/148.9 |
| 5,973,061 A | 10/1999 | Feder et al. | |
| 5,988,695 A | 11/1999 | Corbett, Jr. | |
| 5,992,469 A | 11/1999 | Hegler | |
| 5,996,635 A | 12/1999 | Hegler | |
| 6,082,741 A | 7/2000 | Gregoire et al. | |
| 6,126,173 A | 10/2000 | Westhoff et al. | |
| 6,126,209 A | 10/2000 | Goddard | |
| 6,170,883 B1 | 1/2001 | Mattsson et al. | |
| 6,193,285 B1 | 2/2001 | Proctor | |
| 6,226,937 B1 * | 5/2001 | Carlton | 52/169.5 |
| 6,237,966 B1 | 5/2001 | Kearns | |
| 6,328,309 B1 | 12/2001 | Corbett, Jr. | |
| 6,328,349 B2 * | 12/2001 | Bandlow et al. | 285/319 |
| 6,343,623 B2 | 2/2002 | Hegler | |
| 6,359,073 B1 | 3/2002 | Babb et al. | |
| 6,364,373 B1 * | 4/2002 | Brockway | 285/369 |
| 6,367,802 B1 * | 4/2002 | Knapp | 277/314 |
| 6,458,301 B1 | 10/2002 | Hendrix | |
| 6,476,141 B1 | 11/2002 | Chang et al. | |
| 6,550,775 B2 * | 4/2003 | Knapp | 277/314 |
| 6,578,882 B2 * | 6/2003 | Toliver | 285/903 |
| 6,620,369 B1 | 9/2003 | Mead | |
| 6,726,219 B2 | 4/2004 | Bivens | |
| 6,739,632 B1 | 5/2004 | Thomas et al. | |
| 6,938,933 B2 | 9/2005 | Sarita | |
| 7,207,606 B2 | 4/2007 | Owen et al. | |
| 7,267,375 B1 * | 9/2007 | Sorkin | 285/369 |
| 7,306,264 B2 * | 12/2007 | Goddard et al. | 285/903 |
| 7,434,850 B2 * | 10/2008 | Duininck et al. | 285/903 |
| 7,469,905 B2 | 12/2008 | Knapp | |
| 8,109,540 B2 * | 2/2012 | Zepp et al. | 285/903 |
| 2001/0052702 A1 | 12/2001 | Starita | |
| 2001/0054820 A1 | 12/2001 | Starita | |
| 2002/0074741 A1 | 6/2002 | Knapp | |
| 2003/0020276 A1 | 1/2003 | Steele | |
| 2004/0041347 A1 | 3/2004 | Beach et al. | |
| 2004/0072949 A1 | 4/2004 | Ding et al. | |
| 2004/0108722 A1 | 6/2004 | Starita | |
| 2004/0113327 A1 | 6/2004 | Starita | |
| 2004/0207201 A1 | 10/2004 | Starita | |
| 2005/0099003 A1 | 5/2005 | Tarara | |
| 2005/0167982 A1 | 8/2005 | Starita | |
| 2006/0267343 A1 | 11/2006 | Wright | |
| 2006/0279084 A1 | 12/2006 | Collins | |
| 2007/0001456 A1 | 1/2007 | Diez et al. | |
| 2007/0075544 A1 | 4/2007 | Duininck et al. | |
| 2007/0290455 A1 | 12/2007 | Knapp et al. | |
| 2009/0065968 A1 | 3/2009 | Knapp | |
| 2009/0295153 A1 | 12/2009 | Knapp | |

(56) References Cited

U.S. PATENT DOCUMENTS

FOREIGN PATENT DOCUMENTS

| | | |
|---|---|---|
| DE | 3728034 | 3/1989 |
| DE | 3826622 | 2/1990 |
| DE | 3909381 | 12/1990 |
| DE | 4003283 | 8/1991 |
| DE | 4207849 | 9/1993 |
| DE | 4241622 | 6/1994 |
| DE | 19628639 | 1/1998 |
| EP | 0311296 | 4/1989 |
| EP | 192597 | 4/1990 |
| GB | 2218768 | 11/1989 |
| GB | 2331137 | 5/1999 |
| JP | 02113193 | 4/1990 |
| JP | 04277394 | 3/1991 |
| JP | 06109174 | 4/1994 |
| JP | 06109193 | 4/1994 |
| JP | 06221482 | 8/1994 |

OTHER PUBLICATIONS

Two page advertisement entitled "Cost-Effective Watertight Seals for Corrugated Pipe", print out from NPC, Inc. web site on Mar. 11, 2008. http://npc.com/products/pipe-connectors/pipe-adaptor.htm.

Two page advertisement showing "Watertyte Joint Design", print out from CPP Engineering, LLC web site on Mar. 11, 2008. http://www.cpp-engineering.com/WarertyteJointDesign.htm.

Notification of Transmittal of international Preliminary Report on Patentability (7 pages) for International Application No. PCT/US06/017512, mailed Jan. 27, 2011.

International Search Report and Written Opinion; Application No. PCT/US2009/045114, mailed Jul. 1, 2009, 11 pages.

European Search Report dated Sep. 24, 2009, Application No. 05853734.1, 25 pages.

\* cited by examiner

PIPE COUPLING SYSTEM AND METHOD

CROSS REFERENCE TO RELATED APPLICATION

The present application is a non-provisional application that claims priority to U.S. Provisional Application Ser. No. 61/480,748 entitled PIPE COUPLING SYSTEM AND METHOD that was filed on Apr. 29, 2011 with the United States Patent Office. The present application claims priority to said provisional application, which is incorporated by reference in its entirety herein for all purposes.

TECHNICAL FIELD

The present invention relates to a pipe coupling system and method for connecting two pieces of pipe or over an opening in a single pipe, and more specifically, a pipe coupling assembly providing a fluid-tight connection between two pieces of piping or over an opening in a single pipe.

BACKGROUND

It is desirable to form a fluid-tight seal between two pipe sections, including piping typically used for drainage, sanitary sewer applications, and water collecting on the surface and in the ground of agricultural, residential, and commercial properties. Historically, clay tile was used to achieve a desired drainage level. Clay tile is typically constructed in one or two foot sections and possesses many inherent deficiencies, such as, susceptibility to cracking, labor-intensive installation in placement of the sections in close proximity, and the significant amount of weight associated with each section.

The above deficiencies identified with clay tile are likely a cause for the more recent creation and popularity of using corrugated plastic piping (typically formed from polyethylene) for various drainage applications. The corrugations in the piping provide both strength and flexibility, allowing single continuous sections to extend in excess of one-hundred feet before connecting to a mating pipe section.

It is desirable to form a fluid-tight seal between the mating corrugated pipe sections. In order to form the mating connection, special geometrical construct is typically required at the ends of the pipe sections to be joined. The typical geometrical construction of the sections includes one of the two ends of the pipe having an end formation for insertion, typically referred to as a spigot. A pipe receiving end formation for receiving the spigot end of a pipe is typically, referred to as a bell is designed to have an inner diameter greater than the outer diameter of the spigot, such that the spigot is inserted into the bell to form the fluid-tight seal.

It is not uncommon to place an elastomeric gasket around the outer diameter of the spigot that contacts the inner diameter of the bell, providing the fluid tight sealing connection as discussed further in U.S. Pat. No. 7,469,905 that issued Dec. 30, 2008 entitled PERMANENTLY LUBRICATED FILM GASKET AND METHOD OF MANUFACTURE assigned to SpringSeal Inc. of Streetsboro, Ohio, which is incorporated in its entirety herein by reference for all purposes. Typically, a clamping device such as a hose clamp is positioned and secured over the bell between gasket and opening end of the bell to assist in forming the fluid-tight seal.

A large friction force is typically encountered when the spigot, having an elastomeric gasket is inserted into the bell. As the spigot is being inserted, the gasket is at times pulled from its position by the large frictional force. Additionally, the bell or outer pipe of the mating pipe sections has a tendency to deflect away from the elastomeric gasket during insertion. The deflected area of the outer pipe or bell is often disposed to leaks and is further weakened with its exposure to fluid and/or fluid pressure.

SUMMARY

One example embodiment of the present disclosure includes a coupler assembly for use with a pipe or piping sections comprising a unitary annular body, forming first and second cylindrical openings for surrounding a pipe or piping sections to facilitate forming a fluid-tight seal therein. The unitary annular body comprises a medial portion and first and second longitudinal portions integrally connected to opposite ends of the medial portion. Extending from the first and second longitudinal portions away from the medial portion are respective first and second locking arrangements for securing the coupler assembly to a pipe or piping sections.

Another example embodiment of the present disclosure includes a coupler assembly for forming a fluid-tight seal during use with a pipe or piping sections. The coupler assembly comprises a unitary annular body extruded to form first and second cylindrical openings for surrounding a pipe or piping sections during use. The unitary annular body comprises an undulating medial portion and first and second longitudinal portions integrally extruded to opposite ends of the medial portion. Extending from the first and second longitudinal portions away from the medial portion are respective first and second locking arrangements for securing the coupler assembly to a pipe or piping sections wherein said first and second locking arrangements further comprise a support end and a spaced engagement end located at opposite ends of a locking body, the locking body being transversely oriented to said longitudinal portions such that said support end extending from said engagement end trusses the coupler, strengthening the coupler from deflection or separation during use.

Yet another example embodiment of the present disclosure includes a coupler assembly for forming a fluid-tight seal during use with a pipe or piping sections, the coupler assembly comprises a unitary annular body extruded to form first and second cylindrical openings for surrounding a pipe or piping sections during use. The unitary annular body comprises a medial portion and first and second longitudinal portions integrally extruded in opposite ends of the medial portion. Extending from the first and second longitudinal portions away from the medial portion are respective first and second flex members for securing the coupler assembly to a pipe or piping sections, the flex members transversely oriented radially inward through a first region then expanding radially outward through a second region.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, wherein like reference numerals refer to like parts unless described otherwise throughout the drawings and in which.

DETAILED DESCRIPTION

Referring now to the figures generally wherein like numbered features shown therein refer to like elements throughout unless otherwise noted. The present disclosure provides a pipe coupling system and method for connecting two pieces of pipe, and more specifically, a pipe coupling system and method for providing a fluid-tight connection between two pieces of piping, over a leak in a pipe, or separation in a single pipe.

Figure 1:
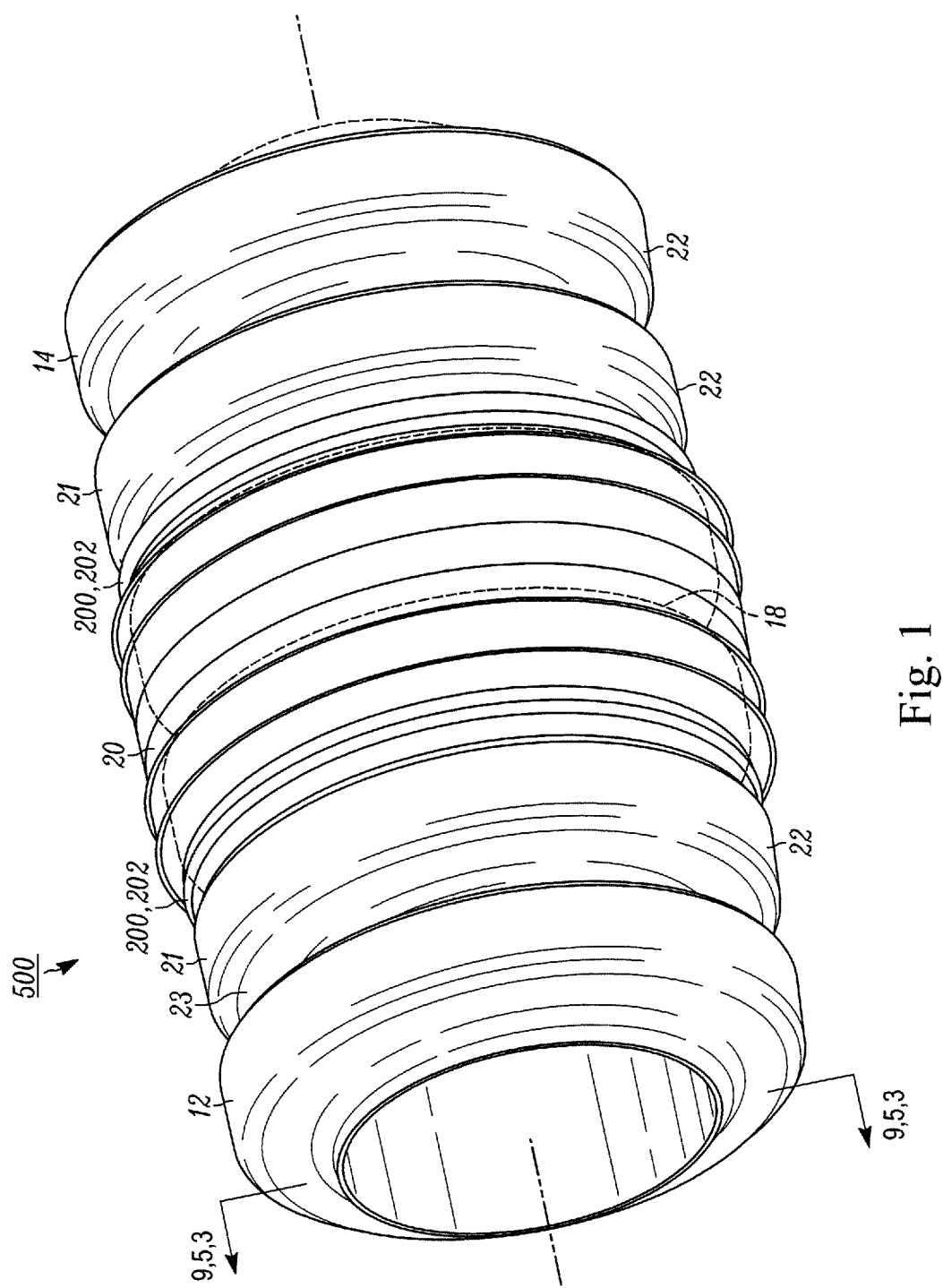
FIG. 1 is a perspective view of a pipe coupling system constructed in accordance with one embodiment of the disclosure forming a fluid-tight sealing connection between two corrugated pipe sections.

Referring to the figures, and in particular FIG. 1 is a perspective view of a pipe coupling assembly 500 constructed in accordance with one embodiment of the disclosure forming a fluid-tight sealing connection between first and second pipe sections 12, 14, respectively. The pipe coupling assemblies of the present disclosure are designed to connect sections of piping during fabrication at manufacturing facilities, during installation of the pipe at its designated site, or to repair broken or leaking connections in the field.

Referring again to FIG. 1, the pipe coupling assembly 500 provides a fluid-tight connection between first 12 and second 14 pipe sections over a void 18 therebetween. The void 18 represents the space between the pipes sections that can range from several inches to a hairline break or fractures in either one of the pipe sections 12 or 14. The pipe coupling assembly 500 advantageously adapts first and second pipe sections 12, 14 together without having special geometrical constructions at the pipe section ends, such as bell and spigot configurations typically required in conventional piping connections. Accordingly, the pipe coupling assembly 500 reduces the expense and cost associated with forming special end configurations required or special sealing gaskets for connecting conventional corrugated piping sections. Further, the pipe coupling assembly 500 advantageously provides the flexibility of attaching two sections of piping or sealing a leak or leaks in an existing pipe at any location along the pipe. Yet another advantage provided by the coupling assembly 500 is its ability to connect any length of pipe, eliminating the need for standard pipe lengths having specialized end connections, such as bells and spigots.

The pipe coupling assembly 500 includes an annular body 20 formed of a unitary, tubular configuration that is circumferentially positioned around transverse corrugations 22 of first and second pipe sections 12, 14. Alternatively, for repairing a leak, the annular body 20 is circumferentially positioned around transverse corrugations of a single pipe section 12 or 14, or two pipe sections formed from a single pipe section.

The unitary tubular configuration can be formed by welding opposite ends of the annular body 20 together. The welding of the ends of a coupling can be achieved in a similar fashion as described in U.S. Pat. No. 7,503,992 entitled FLASHLESS WELDING METHOD AND APPARATUS that issued on Mar. 17, 2009 and assigned to SpringSeal Inc. of Streetsboro, Ohio. The U.S. Pat. No. 7,503,992 is incorporated herein by reference in its entirety for all purposes. The corrugated pipe sections 12, 14, include a plurality of crests 21 and valleys 23 and an inner pipe or liner 24 that can be independent or fused to the transverse corrugations 22, as best seen by the partial-sectional-side view of FIGS. 3, 5, and 7.

Figure 4:
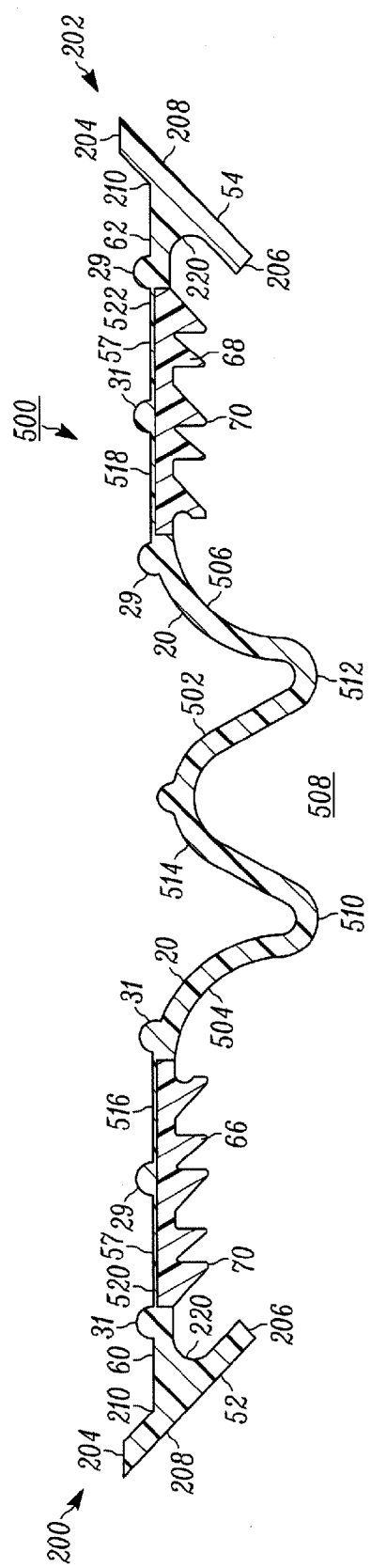
FIG. 4 is a partial sectional-side view of a pipe coupling assembly constructed in accordance with one example embodiment of the present disclosure.
Figure 5:
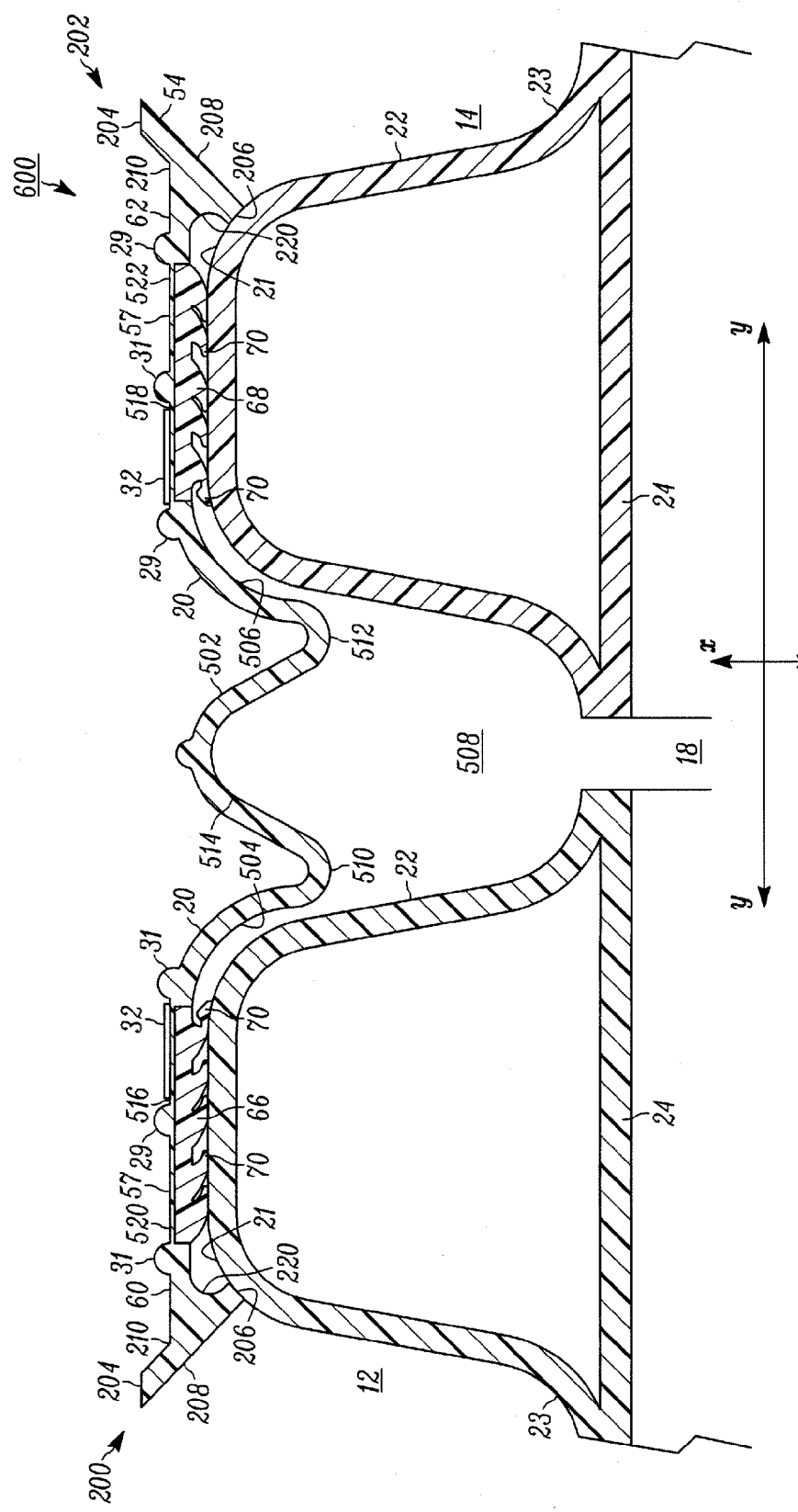
FIG. 5 is a partial sectional-side view of the pipe coupling assembly of FIG. 1 along section lines 5-5, illustrating the example embodiment of FIG. 4.
Figure 6:
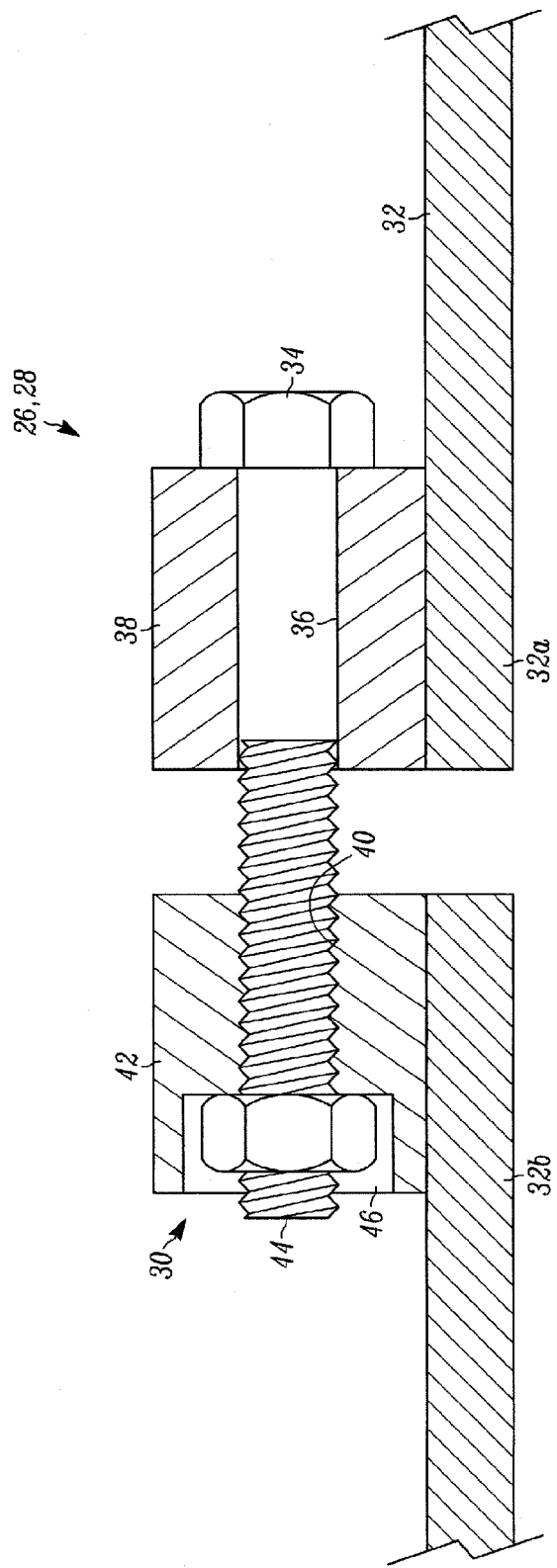
FIG. 6 is a partial sectional-side view of a pipe coupling assembly having an attachment assembly in accordance with one example embodiment of the present disclosure.

The pipe coupling assembly 500 in the example embodiments of FIGS. 2-6 further comprises body clamping structures 26 and 28 positioned between first and second locating bosses 29, 31 for use with high pressure applications. In one embodiment, the body clamping structures 26 and 28 comprise an attachment assembly 30, as illustrated in FIG. 6. The attachment assembly 30 includes a circular strap 32 for securing the annular body 20 over the respective pipe sections 12, 14, during installation by locking together first and second ends 32a and 32b, respectively. The attachment assembly 30 further comprises a fastener 34 that passes through a clearance-hole 36 of a first fixture 38 secured to the first end 32a of the circular strap 32. The fastener 34 passes through a second clearance-hole 40 in a second fixture 42 secured to the second end 32b of the circular strap 32. The fastener 34 includes a threaded end 44 for adjustably securing the strap 32 in combination with a nut 46. Alternatively, as illustrated in the example embodiment of FIG. 6, the second clearance hole 40 is tapped or threaded, avoiding the need for the nut 46, as the fastener 34 engages at its threaded end 44 with the second fixture 42.

While the attachment assembly 30 illustrates one embodiment for securing the strap 32 over the annular body 20, other types of clamps, such as tie wraps, hose clamps, lever or toggle clamps, and the like, could also be used without departing from the spirit and scope of the claimed invention. Further, the attachment assembly 30 in the exemplary embodiment of FIGS. 2-4 is composed of nylon, but could also be made from steel, fiberglass, or plastic.

As an alternative to, or to be used in conjunction with the clamping structures 26 and 28 for securing the annular body 20 to the pipe or pipes 12 and 14 are first and second locking arrangements 200 and 202 (see FIGS. 1-5). The locking arrangements 200 and 202 provided for securing first 52 and second 54 ends, respectively of the annular body over, and to, the crest 21 of the transverse corrugations 22 into the valleys 23. The locking arrangements 200, 202 resist separation forces between the pipe member or members 12, 14, and advantageously eliminate extra clamps at the end of the coupler as illustrated in U.S. patent application Ser. No. 12/471,576 that was filed on May 26, 2009 and published on Dec. 3, 2009 under U.S. Publication No. US 2009/0295153 (hereinafter "the '153 Publication"). The '153 Publication is assigned to the assignee of the present disclosure and incorporated herein by reference in its entirety for all purposes.

Figure 2:
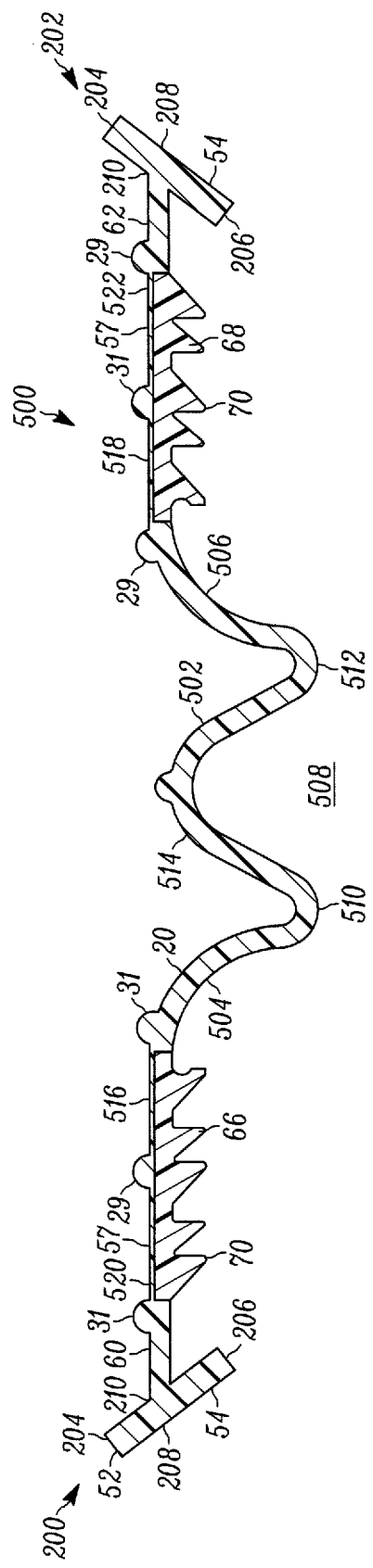
FIG. 2 is a partial sectional-side view of a pipe coupling assembly constructed in accordance with one example embodiment of the present disclosure.
Figure 3:
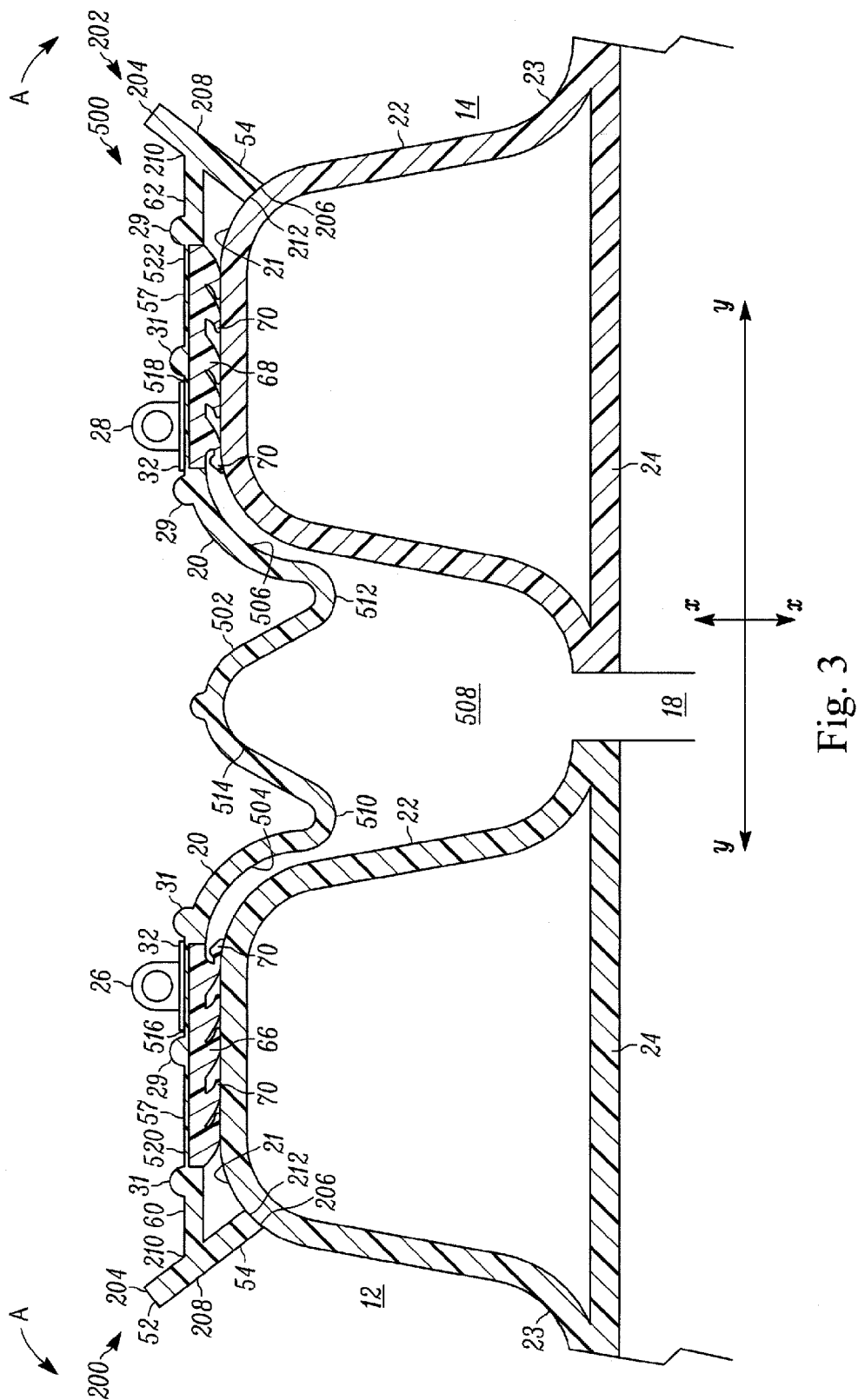
FIG. 3 is a partial sectional-side view of the pipe coupling assembly of FIG. 1 along section lines 3-3, illustrating the example embodiment of FIG. 2.

FIG. 2 illustrates a partial sectional-side view of an example embodiment of an annular pipe coupling assembly 500, the pipe coupling assembly provides a fluid-tight connection between first 12 and second 14 pipe sections over a void 18 therebetween, as illustrated in FIG. 3. The void 18 represents the space between the pipes sections that can range from several inches to a hairline break or fractures in either one of the pipe sections 12 or 14 or between adjoining pipe sections. The pipe coupling assembly 500 advantageously adapts first and second pipe sections 12, 14 together without having special geometrical constructions at the pipe section ends, such as bell and spigot configurations typically required in conventional piping connections.

Accordingly, the pipe coupling assembly 500 reduces the expense and cost associated with forming special end configurations required or special sealing gaskets for connecting conventional corrugated piping sections. Further, the pipe coupling assembly 500 advantageously provides the flexibility of attaching two sections of piping or sealing a leak or leaks in an existing pipe at any location along the pipe. Yet another advantage provided by the coupling assembly 500 is its ability to connect any length of pipe, eliminating the need for standard pipe lengths having specialized end connections, such as bells and spigots.

The annular body 20 in the exemplary embodiment of FIGS. 2 and 3 comprises a plurality of elastomeric materials unitarily formed by extruding or molding operations. The unitary annular body 20 comprises an undulating medial section 502 that also includes arcuate stops 504 and 506 along the inner portion of the annular body that facilitate the positioning of the coupling assembly 500 against or near the crests 21 of the corrugations 22 during installation (see FIG. 3). In particular, the stops 504, 506 are constructed to form an inner region 508 comprising inner lobes 510 and 512 of the undulating medial section 502. The stops 504, 506 may contact the corrugation 22 during assembly as an indicator to the user that the coupling is properly seated. The addition of the stops 502, 506 prevent the coupling assembly 500 from over traveling during installation by contacting a portion of the crest 21 of the corrugation 22 once a sufficient amount of insertion is achieved. However, it should be noted and as shown in FIG. 3, a fluid tight seal is still achieved even if the stops 504, 506 do not contact the corrugation 22. The undulating medial section 502 further comprises a riser 514 that provides strength to the overall annular pipe coupling assembly 500 when welded in forming its annular shape. In particular, the riser 514 in combination with the inner lobes 510 and 512 prevent kinking or stresses in the coupling when assembled. The geometrical profile of the undulating medial section 502 also provides strength to the overall coupling assembly while allowing added flexibility between first 52 and second 54 ends of the annular body during assembly onto the pipe or pipes, 12, 14.

Located longitudinally to the undulating medial section 502 and stops 504, 506 are locking arrangements 200, 202 and longitudinal portions 60, 62. The undulating medial section 502, stops 504, 506, longitudinal portions 60, 62, and locking arrangements 200 and 202 in the illustrated embodiment have a durometer ranging between 35-50 on a Shore D scale and preferably a Shore D value of approximately 40. The material thickness in the sectional view shown in FIGS. 2 and 3 for the undulating medial section 502, stops 504, 506, longitudinal portions 60, 62, and locking arrangements 200, 202 range between approximately 1/16" and 1/4" inches and are preferably 1/8" inches thick for smaller diameter applications, for example 12" inches or less and preferably 3/16" inch thick for larger diameter applications.

It is noted that any material having such relative hardness and flexibility capable of handling the water pressure to prevent stretching or ballooning of the undulating medial section 502, longitudinal portions 60, 62, and locking arrangements can be used, and examples of suitable materials include High Density Polyethylene ("HDPE") and rigid polypropylene plastic. The undulating medial section 502, stops 504, 506, longitudinal portions 60, 62, and locking arrangements 200, 202 help hold the shape of the annular body 20 over the piping sections 12, 14 with relatively little radial deformation. In contrast, the undulating medial section 502 allows for longitudinal deformation and permits hinge-like motion in the annular body in order to accommodate misalignment between the pipe sections 12, 14 and ease of assembly, including, installing the coupling assembly 500 during repairs in the field or over a leak in a single pipe section.

The pipe coupling assembly 500 further comprises body clamping structures 26 and 28 positioned within securing stations 516 and 518 between first and second locating bosses 29, 31, used particularly with high pressure applications. In one embodiment, the body clamping structures 26 and 28 comprise an attachment assembly 30, as illustrated in FIG. 6. The attachment assembly 30 includes a circular strap 32 for securing the annular body 20 over the respective pipe sections 12, 14, during installation by locking together first and second ends 32a and 32b, respectively. While the attachment assembly 30 illustrates one embodiment for securing straps 32 over the annular body 20, other types of clamps, such as tie wraps, hose clamps, lever or toggle clamps, and the like, could also be used without departing from the spirit and scope of the claimed invention. Further, the clamping structures 26 and 28 in the exemplary embodiment of FIGS. 2 and 3 are composed of steel, but could also be made from nylon, fiberglass, or plastic.

In addition to the security provided by the clamping structures 26 and 28 to the annular body 20, additional securing stations 520 and 522 are provided for high pressure applications. The plurality of securing stations 516-522 that surround the coupler 500 also provide flexibility in locating the clamping structures based on variations in the corrugations 22 size.

The unitary tubular configuration can be formed by welding opposite ends of the annular body 20 together. The welding of the ends of a coupling can be achieved in a similar fashion as described in U.S. Pat. No. 7,503,992 entitled FLASHLESS WELDING METHOD AND APPARATUS that issued on Mar. 17, 2009, which has been incorporated herein by reference in its entirety.

The annular body 20 further comprises first and second annular sealing members 66 and 68, respectively. The annular sealing members 66, 68 are made from a relatively lower durometer material (ranging between approximately 40 to 60 on a Shore A scale) to form a pliable fluid-tight seal with the respective sections of pipe 12 or pipe sections 12 and 14. Facilitating the pliable fluid-tight seal are lobes 70 projecting from the sealing members 66, 68 toward the void 18, producing a pressure enhancing seal. The lobes 70 are in contact with the crest 21 of respective sections of pipes 12, 14 and further deform upon the tightening of the circular straps 32.

An example of a suitable material for the sealing members 66, 68 includes ASTM F477 Low Head material (ASTM F477 LH), which has a durometer of 50 plus or minus five on a Shore A scale. One company that makes ASTM F477 LH material is Advanced Elastomer Systems L.P. located in Akron, Ohio under their brand name SANTOPRENE®. Advanced Elastomer Systems' part number for SANTOPRENE® is 101-55. Dow Corning also produces ASTM F477 LH material under the part number 5904LC. Although elastomeric materials have been discussed, various polymers, thermoplastics, or rubbers having a durometer within the above-identified ranges could also be used as suitable materials without departing from the spirit and scope of the claimed invention.

Reinforcing sections 57 ranging between 0.002" to 0.005" of an inch in thickness are formed with the 35-50 Shore D material and extend from the medial section 502 and the longitudinal portions 60, 62 and form the securing sections 516-522 covering the sealing members 66, 68. The reinforcing sections 57 provide support to the annular member 20 and prevent penetration, ballooning, or tearing in the sealing members 66, 68 by the straps 32. The reinforcing sections 57 also provide enough rigidity to allow clamping structures to be used without tearing the softer material used in the sealing members 66 and 68.

In another example embodiment, the reinforcing sections 57 thicknesses range between 0.010 and 0.040 inches, and preferably 0.030 inches. The additional thickness of the reinforcing structure in addition to the dimensional stack-up of piping sections 12 and 14 produce enough pressure during assembly to eliminate the need for clamping structures or locking clamps. This may be particularly desirable in low pressure applications.

The locking arrangements 200 and 202 in the illustrated example embodiment, comprise a support end 204, engagement end 206, and body 208 having a relatively uniform thickness and material composition as that of longitudinal portions 60, 62. The locking arrangements 200, 202 connect with longitudinal portions 60, 62 at intersection 210.

The annular body 208 of the locking arrangements 200, 202 extend transversely across the longitudinal axis "y" and lateral axis "x" of the pipe members 12, 14 toward the void 18, as illustrated in FIG. 3. As a result, the locking arrangements 200, 202, trusses with the respective pipe members 12, 14, such that the engagements end 206 bind along the corrugations at contact points 212 to resist separation of the pipe members. Enhanced strength is achieved to resist separation pressure by the extension of the support end 204 away from the respective pipe members 12 and 14 and normal to the contact points 212.

In the illustrated example embodiment, the geometrical configuration of an undulating medial section 502 in the coupler 500 allows for flexibility about an inner region 508 of the coupler to raise and lower the respective locking arrangements 200 and 202 into place, while maintaining the rigidity of the locking members 200, 202 upon engagement of the pipe members 12, 14 at contact points 212. The trussing capabilities used for securing the coupler 500 to the pipe or pipe members 12, 14 is further enhanced by the wedging effect of forcing the contact points 212 further down the corrugation during assembly, as indicated by arrows "A" in FIG. 3.

The geometrical make-up of the locking arrangements 200, 202 and changing profile of the corrugations along the longitudinal axis "y", provide an expanding transverse relationship that results in an increasingly binding configuration that resists field separation. Such relationship is sufficient to impose sealing engagement with the sealing members 66 and 68 to a fluid-tight connection without the need of body clamping structures 26 and 28.

In the illustrated example embodiment, the locking members 200 and 202 provide sufficient separation resistance in the field to be the only form of attachment between the coupler 500 and pipe members 12, 14 for soil resistant applications. That is, soil resistant applications convey fluids under negligible pressure. This advantageously eliminates the cost associated with the parts and labor in securing the coupler by attachment assemblies 30, as illustrated in FIGS. 2-3, and 6.

During the manufacturing of the piping sections in for example, a plant or manufacturing facility, an operator can attach two pipe sections 12, 14 without the need for any special end configurations such as a spigot or bell typically required in conventional corrugated piping. Instead, the operator can use the coupling assembly 500 for attaching the ends of any two-pipe sections. In the illustrated example embodiment of FIG. 3, the annular body 20 is pushed onto the first pipe section 12 that traverses the crest 21 until the stop 504 is engaged by or in close proximity with the transverse corrugation section 22, forcing the lobes 70 of the annular sealing member 66 toward the void 18 in a pressure enhancing orientation.

Once the first section of pipe 12 is in place, the second section of pipe 14 is inserted into the annular body 20 until the stop 506 is engaged by or in close proximity with the transverse corrugation section 22, forcing the lobes 70 of the annular sealing member 68 toward the void 18 in a pressure enhancing orientation against respective crests 21. Under high pressure applications, body clamping structures 26 and 28 are positioned over respective sealing members 66, 68 in first sets of securing structures 516-518 or 520-522 or both, depending on the size of the corrugation and/or pressure requirements.

In the field, upon discovering a leak, a contractor can cut along the leak of any piece of corrugated pipe at any location to form first and second pipe sections 12, 14 of FIG. 3 by using a saw, portable router, or knife. The pipe coupling assembly 500 is assembled over the pipe sections 12, 14 in a similar fashion as the method described above for assembly in a manufacturing facility or plant.

The construct of the pipe coupling assembly 500 in addition to the strength and sealing advantages described also provides advantageously a design with reduced cost for manufacturing. That is, the more pliable and costly material found, for example in the sealing members 66 and 68 are molded or co-extruded only in the areas needed, as shown in the illustrated embodiments.

The overall length of the pipe coupling assembly 500 is not limited to any particular size and could span several inches or even feet to adjoin separated pipe sections. In one embodiment, the pipe coupling assembly 500 has a diameter ranging from one (1") inch to sixty (60") inches that attach corresponding diameters in first and second pipe sections, 12 and 14, respectively. The pipe coupling assembly 500 having a relatively smaller scale of twelve (12") inches in diameter or less, for example, is suitable for residential and commercial applications. Further, in one embodiment, the annular body 20 covers several transverse sections 22 on each side before encountering the void 18 or leak in the piping section.

Referring now to FIGS. 4 and 5 is a coupler assembly 600 constructed in accordance with another example embodiment of the present disclosure. The coupler assembly 600 operates and is constructed in the same manner as the coupler assembly 500 illustrated in FIGS. 2 and 3, except for the locking arrangements 200 and 202, which are more robust than the example embodiment of the coupler assembly 500 illustrated in FIGS. 2-3. In particular, the locking arrangements 200, 202 in the example embodiment of FIGS. 4-5 include a thicker intersection 210 extending from the longitudinal portions 60, 62. As well, the locking arrangements 200 and 202 further comprise a gusset member 220 that significantly enhances the stiffness of the locking arrangements, thereby increasing the coupler 600 separation resistance.

The example embodiment of FIGS. 4 and 5 are constructed such to provide sufficient separation resistance in the field in the form of attachment between the coupler 600 and pipe members 12, 14 for soil resistant and low pressure applications. This advantageously eliminates the cost associated with the parts and labor in securing the coupler by attachment assemblies 30, as illustrated in FIGS. 2-3, and 6.

Figure 7:
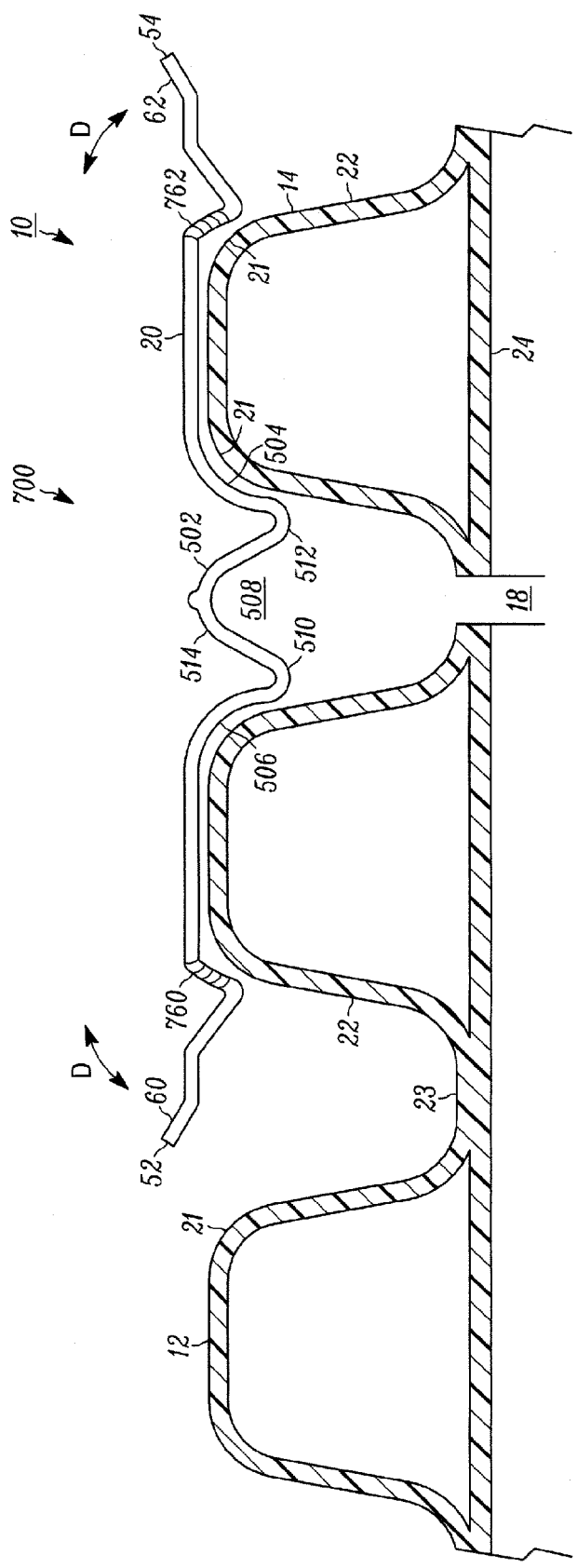
FIG. 7 is a partial sectional-side view of a pipe coupling assembly constructed in accordance with one example embodiment of the present disclosure.

Referring now to FIG. 7 is a coupler assembly 700 constructed in accordance with another example embodiment of the present disclosure. In particular, the coupler assembly 700 comprises an annular body 20 in the exemplary embodiment having a plurality of elastomeric materials unitarily formed by extruding or molding operations.

The unitary annular body 20 comprises an undulating medial section 502 that also includes arcuate stops 504 and 506 along the inner portion of the annular body that facilitate the positioning of the coupling assembly 500 against or near the crests 21 of the corrugations 22 during installation. In particular, the stops 504, 506 are constructed to form an inner region 508 comprising inner lobes 510 and 512 of the undulating medial section 502. The stops 504, 506 may contact the corrugation 22 during assembly as an indicator to the user that the coupling is properly seated. The addition of the stops 502, 506 prevent the coupling assembly 500 from over traveling during installation by contacting a portion of the crest 21 of the corrugation 22 once a sufficient amount of insertion is achieved.

However, it should be noted and as shown in FIG. 7, a fluid tight seal is still achieved even if the stops 504, 506 do not contact the corrugation 22. The undulating medial section 502 further comprises a riser 514 that provides strength to the overall annular pipe coupling assembly 500 when welded in forming its annular shape. In particular, the riser 514 in combination with the inner lobes 510 and 512 prevent kinking or stresses in the coupling when assembled. The geometrical profile of the undulating medial section 502 also provides strength to the overall coupling assembly while allowing added flexibility between first 52 and second 54 ends of the annular body during assembly onto the pipe or pipes, 12, 14.

Located longitudinally to the undulating medial section 502 and stops 504, 506 are longitudinal portions 60, 62. The undulating medial section 502, stops 504, 506, and longitudinal portions 60, 62 in the illustrated embodiment have a durometer ranging between 35-50 on a Shore D scale and preferably a Shore D value of approximately 40. The material thickness in the sectional view shown in FIG. 7 for the undulating medial section 502, stops 504, 506, and longitudinal portions 60, 62 range between approximately 1/16" and 1/4" inches and are preferably 1/8" inches thick for smaller diameter applications, for example 12" inches or less and preferably 3/16" inch thick for larger diameter applications.

It is noted that any material having such relative hardness and flexibility capable of handling the water pressure to prevent stretching or ballooning of the undulating medial section 502, longitudinal portions 60, 62, and locking arrangements can be used, and examples of suitable materials include High Density Polyethylene ("HDPE") and rigid polypropylene plastic. The undulating medial section 502, stops 504, 506, and longitudinal portions 60, 62 help hold the shape of the annular body 20 over the piping sections 12, 14 with relatively little radial deformation. In contrast, the undulating medial section 502 allows for longitudinal deformation and permits hinge-like motion in the annular body in order to accommodate misalignment between the pipe sections 12, 14 and ease of assembly, including, installing the coupling assembly 700 during repairs in the field or over a leak in a single pipe section.

The unitary tubular configuration of the coupler assembly 700 can be formed by welding opposite ends of the annular body 20 together. The welding of the ends of a coupling can be achieved in a similar fashion as described in U.S. Pat. No. 7,503,992 entitled FLASHLESS WELDING METHOD AND APPARATUS that issued on Mar. 17, 2009, which has been incorporated herein by reference in its entirety.

The annular body 20 further comprises first and second flex members 760 and 762, respectively. The annular flex members 760 and 762 are made from a relatively lower durometer material (ranging between approximately 40 to 60 on a Shore A scale).

An example of a suitable material for the flex members 760 and 762 includes ASTM F477 Low Head material (ASTM F477 LH), which has a durometer of 50 plus or minus five on a Shore A scale. One company that makes ASTM F477 LH material is Advanced Elastomer Systems L.P. located in Akron, Ohio under their brand name SANTOPRENE®. Advanced Elastomer Systems' part number for SANTOPRENE® is 101-55. Dow Corning also produces ASTM F477 LH material under the part number 5904LC. Although elastomeric materials have been discussed, various polymers, thermoplastics, or rubbers having a durometer within the above-identified ranges could also be used as suitable materials without departing from the spirit and scope of the claimed invention.

The flex members 760 and 762 allow for the ease in installation of the coupler assembly 700 over pipe members 12 and 14 by the rotational movements of longitudinal portions 60, 62 in the direction of arrows D illustrated in FIG. 7. This rotational movement is only achieved by the lower durometer material in the flex members 760 and 762 relative to the higher durometer material used in the remaining structure of the coupler 700.

Figure 8:
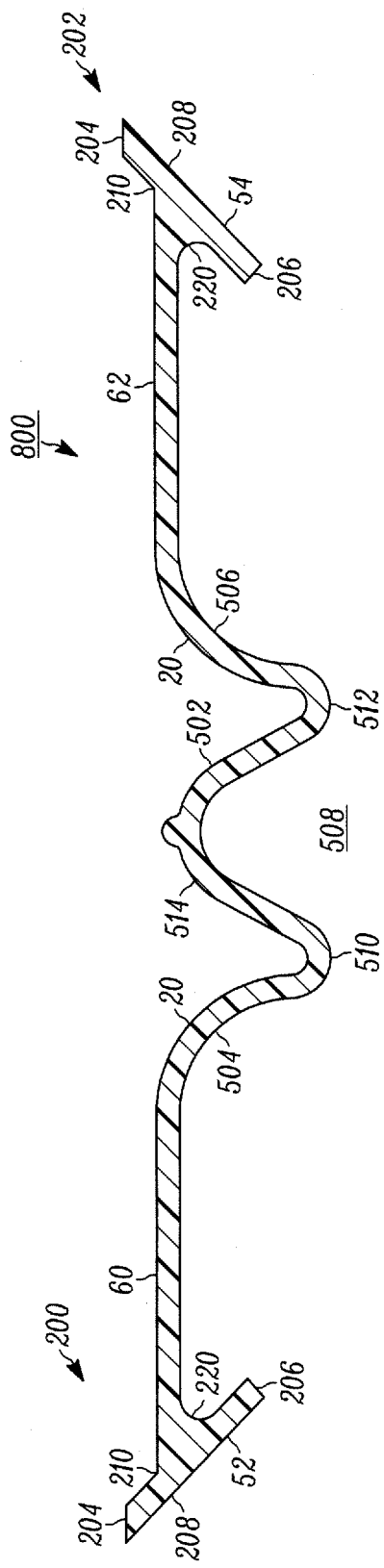
FIG. 8 is a partial sectional-side view of a pipe coupling assembly constructed in accordance with one example embodiment of the present disclosure.
Figure 9:
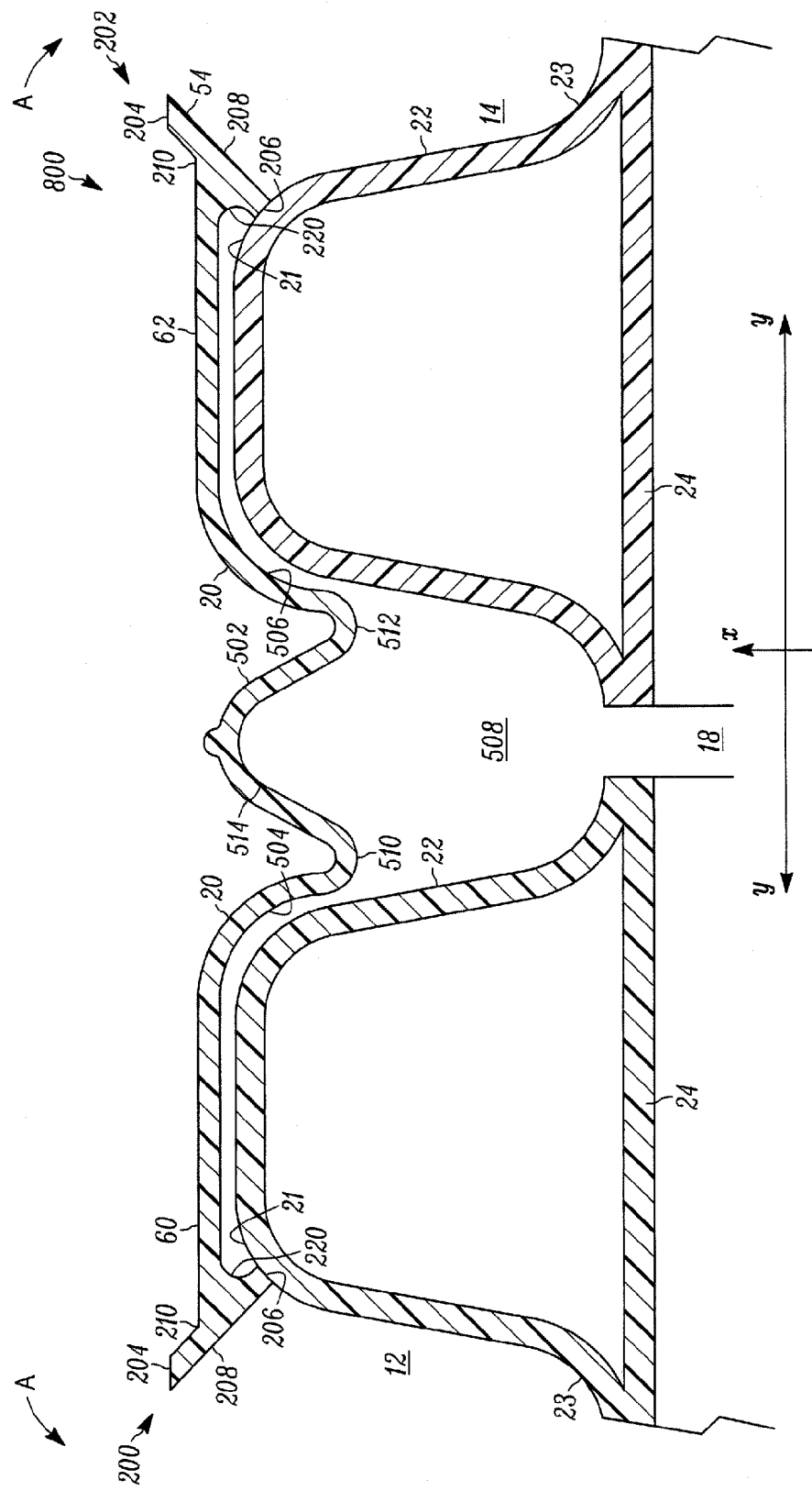
FIG. 9 is a partial sectional-side view of the pipe coupling assembly of FIG. 1 along section lines 9-9, illustrating the example embodiment of FIG. 8.

Referring now to FIGS. 8 and 9 is a pipe coupling assembly 800 constructed in accordance with another example embodiment of the present disclosure. The pipe coupling assembly 800 provides a field connection between first 12 and second 14 pipe sections over a void 18 therebetween. The void 18 represents the space between the pipes sections that can range from several inches to a hairline break or fractures in either one of the pipe sections 12 or 14.

The field connection allows for the coupling of the pipe or pipes 12, 14 over the void 18 during assembly, transport, or positioning of the pipe or pipes into the earth's surface or ground. It is a convenient method of attaching a pipe or pipes over a void 18 during such operations and reduces handling and assembly costs experienced in conventional couplers that typically include hose clamps and the like.

The field connection provided by the coupling assembly 800 allows for small percentage ground leakage at the connection over the void 18 of the fluid transported in the pipe or pipe members 12, 14. While the majority of the fluid being transported in the pipe passes over the void to the other pipe or pipe section without leaking. In applications for the transportation of fluids where small percentages of leakage is permissible, this coupling assembly 800 advantageously provides a low cost configuration that is relatively easy to assemble without the need of clamp assemblies and the like. In one example embodiment, it is believed that the leakage of fluid passing over the void 18 through the coupling assembly 800 would be less than ten (10%) percent.

The pipe coupling assembly 800 advantageously adapts first and second pipe sections 12, 14 together without having special geometrical constructions at the pipe section ends, such as bell and spigot configurations typically required in conventional piping connections. Accordingly, the pipe coupling assembly 800 also reduces the expense and cost associated with forming special end configurations required or special sealing gaskets for connecting conventional corrugated piping sections. Further, the pipe coupling assembly 800 advantageously provides the flexibility of attaching two sections of piping or sealing a leak or leaks in an existing pipe at any location along the pipe. Yet another advantage provided by the coupling assembly 800 is its ability to connect any length of pipe, eliminating the need for standard pipe lengths having specialized end connections, such as bells and spigots.

The pipe coupling assembly 800 includes an annular body 20 formed of a unitary, tubular configuration that is circumferentially positioned around transverse corrugations 22 of first and second pipe sections 12, 14. Alternatively, for repairing a leak, the annular body 20 is circumferentially positioned around transverse corrugations of a single pipe section 12 or 14, or two pipe sections formed from a single pipe section.

The unitary tubular configuration can be formed by welding opposite ends of the annular body 20 together. The welding of the ends of a coupling can be achieved in a similar fashion as described in U.S. Pat. No. 7,503,992 entitled FLASHLESS WELDING METHOD AND APPARATUS that issued on Mar. 17, 2009 and assigned to SpringSeal Inc. of Streetsboro, Ohio. The U.S. Pat. No. 7,503,992 is incorporated herein by reference in its entirety for all purposes. The corrugated pipe sections 12, 14, include a plurality of crests 21 and valleys 23 and an inner pipe or liner 24 that can be independent or fused to the transverse corrugations 22, as best seen by the partial-sectional-side view of FIGS. 3, 5, 7, and 9.

The annular body 20 in the exemplary embodiment of FIGS. 8 and 9 comprises a single elastomeric material unitarily formed by extruding or molding operations. The unitary annular body 20 comprises an undulating medial section 502 that also includes arcuate stops 504 and 506 along the inner portion of the annular body that facilitate the positioning of the coupling assembly 800 against or near the crests 21 of the corrugations 22 during installation (see FIG. 9). In particular, the stops 504, 506 are constructed to form an inner region 508 comprising inner lobes 510 and 512 of the undulating medial section 502. The stops 504, 506 may contact the corrugation 22 during assembly as an indicator to the user that the coupling is properly seated. The addition of the stops 502, 506 prevent the coupling assembly 800 from over traveling during installation by contacting a portion of the crest 21 of the corrugation 22 once a sufficient amount of insertion is achieved.

The undulating medial section 502 further comprises a riser 514 that provides strength to the overall annular pipe coupling assembly 800 when welded in forming its annular shape. In particular, the riser 514 in combination with the inner lobes 510 and 512 prevent kinking or stresses in the coupling when assembled. The geometrical profile of the undulating medial section 502 also provides strength to the overall coupling assembly while allowing added flexibility between first 52 and second 54 ends of the annular body during assembly onto the pipe or pipes, 12, 14.

Located longitudinally to the undulating medial section 502 and stops 504, 506 are locking arrangements 200, 202 and longitudinal portions 60, 62. The undulating medial section 502, stops 504, 506, longitudinal portions 60, 62, and locking arrangements 200 and 202 in the illustrated embodiment have a durometer ranging between 35-50 on a Shore D scale and preferably a Shore D value of approximately 40. The material thickness in the sectional view shown in FIGS. 8 and 9 for the undulating medial section 502, stops 504, 506, longitudinal portions 60, 62, and locking arrangements 200, 202 range between approximately 1/16" and 1/4" inches and are preferably 1/8" inches thick for smaller diameter applications, for example 12" inches or less and preferably 3/16" inch thick for larger diameter applications.

It is noted that any material having such relative hardness and flexibility capable of handling non-pressurized traveling water can be used, and examples of suitable materials include High Density Polyethylene ("HDPE") and rigid polypropylene plastic. The undulating medial section 502, stops 504, 506, longitudinal portions 60, 62, and locking arrangements 200, 202 help hold the shape of the annular body 20 over the piping sections 12, 14 with relatively little radial deformation. In contrast, the undulating medial section 502 allows for longitudinal deformation and permits hinge-like motion in the annular body in order to accommodate misalignment between the pipe sections 12, 14 and ease of assembly, including, installing the coupling assembly 800 during repairs in the field or over a leak in a single pipe section.

The locking arrangements 200 and 202 in the illustrated example embodiment of FIGS. 8 and 9, comprise a support end 204, engagement end 206, and body 208 having a relatively uniform thickness and material composition as that of longitudinal portions 60, 62. The locking arrangements 200, 202 connect with longitudinal portions 60, 62 at intersection 210.

The annular body 208 of the locking arrangements 200, 202 extend transversely across the longitudinal axis "y" and lateral axis "x" of the pipe members 12, 14 toward the void 18, as illustrated in FIG. 9. As a result, the locking arrangements 200, 202, trusses with the respective pipe members 12, 14, such that the engagements end 206 bind along the corrugations at contact points 212 to resist separation of the pipe members. Enhanced strength is achieved to resist separation pressure by the extension of the support end 204 away from the respective pipe members 12 and 14 and normal to the contact points 212.

In the illustrated example embodiment, the geometrical configuration of an undulating medial section 502 in the coupler 800 allows for flexibility about an inner region 508 of the coupler to raise and lower the respective locking arrangements 200 and 202 into place, while maintaining the rigidity of the locking members 200, 202 upon engagement of the pipe members 12, 14 at contact points 212. The trussing capabilities used for securing the coupler 800 to the pipe or pipe members 12, 14 is further enhanced by the wedging effect of forcing the contact points 212 further down the corrugation during assembly, as indicated by arrows "A" in FIG. 9. The geometrical make-up of the locking arrangements 200, 202 and changing profile of the corrugations along the longitudinal axis "y", provide an expanding transverse relationship that results in an increasingly binding configuration that resists field separation.

During the manufacturing of the piping sections in for example, a plant or manufacturing facility, an operator can attach two pipe sections 12, 14 without the need for any special end configurations such as a spigot or bell typically required in conventional corrugated piping. Instead, the operator can use the coupling assembly 800 for attaching the ends of any two-pipe sections.

In the illustrated example embodiment of FIG. 9, the annular body 20 is pushed onto the first pipe section 12 that traverses the crest 21 until the stop 504 is engaged by or in close proximity with the transverse corrugation section 22, forcing the lobes 70 of the annular sealing member 66 toward the void 18 in a pressure enhancing orientation. Once the first section of pipe 12 is in place, the second section of pipe 14 is inserted into the annular body 20 until the stop 506 is engaged by or in close proximity with the transverse corrugation section 22.

The overall length of the pipe coupling assembly 800 is not limited to any particular size and could span several inches or even feet to adjoin separated pipe sections. In one embodiment, the pipe coupling assembly 800 has a diameter ranging from one (1") inch to sixty (60") inches that attach corresponding diameters in first and second pipe sections, 12 and 14, respectively. The pipe coupling assembly 800 having a relatively smaller scale of twelve (12") inches in diameter or less, for example, is suitable for residential and commercial applications. Further, in one embodiment, the annular body 20 covers several transverse sections 22 on each side before encountering the void 18 or leak in the piping section.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

The invention claimed is:

1. A coupler assembly for use with a pipe or piping sections, the coupler assembly comprising:
   a unitary annular body, forming first and second cylindrical openings for surrounding a pipe or piping sections to facilitate forming a fluid-tight seal during use;
   the unitary annular body comprises a medial portion and first and second longitudinal portions integrally connected to opposite ends of the medial portion; and
   extending from the first and second longitudinal portions away from the medial portion are respective first and second locking arrangements for securing the coupler assembly to a pipe or piping sections wherein said first and second locking arrangements further comprise a support end and a spaced engagement end located at opposite ends of a locking body, the locking body having an intersecting portion engaged by the longitudinal portion between said support end and said engagement end, said locking body further being transversely oriented to said longitudinal portions.

2. The coupler assembly of claim 1 wherein said medial section further comprises a riser located between and radially projecting opposite first and second stops.

3. The coupler assembly of claim 1 wherein said intersecting portion engaged by the longitudinal portion is substantially medially located along said locking body between side support end and said engagement end.

4. The coupler assembly of claim 3 wherein said locking body is substantially the same material thickness throughout.

5. The coupler assembly of claim 3 wherein said locking body is substantially the same material thickness as said first and second longitudinal portions.

6. The coupler assembly of claim 3 wherein said locking body is substantially the same material thickness as said first and second longitudinal portions and said medial portion.

7. The coupler assembly of claim 3 wherein said coupler assembly further comprises first and second sealing members extending from respective first and second longitudinal portions.

8. The coupler assembly of claim 3 further comprising a gusset member connecting said first and second longitudinal portions with said respective locking arrangement.

9. A coupler assembly for forming a fluid-tight seal during use with a pipe or piping sections, the coupler assembly comprising:
   a unitary annular body extruded to form first and second cylindrical openings for surrounding a pipe or piping sections during use;
   the unitary annular body comprises an undulating medial portion and first and second longitudinal portions integrally extruded to opposite ends of the medial portion; and
   extending from the first and second longitudinal portions away from the medial portion are respective first and second locking arrangements for securing the coupler assembly to a pipe or piping sections;
   wherein said first and second locking arrangements further comprise a support end and a spaced engagement end located at opposite ends of a locking body, the locking body being transversely oriented to said longitudinal portions such that said support end extending from said engagement end trusses the coupler, strengthening the coupler from deflection or separation during use.

10. The coupler assembly of claim 9 wherein said undulating medial section further comprises a riser located between and radially projecting opposite first and second stops.

11. The coupler assembly of claim 9 wherein said locking body is substantially the same material thickness throughout.

12. The coupler assembly of claim 9 wherein said locking body is substantially the same material thickness as said first and second longitudinal portions.

13. The coupler assembly of claim 9 wherein said locking body is substantially the same material thickness as said first and second longitudinal portions and said undulating medial portion.

14. The coupler assembly of claim 9 wherein said coupler assembly further comprises first and second sealing members extending from respective first and second longitudinal portions.

15. The coupler assembly of claim 9 further comprising a gusset member forming a fillet with said locking arrangement by connecting said first and second longitudinal portions with said respective locking body, the gusset member enhancing the stiffness of the locking arrangements, thereby increasing the separation resistance of the coupler assembly during use.

16. A coupler assembly for forming a fluid-tight seal during use with a pipe or piping sections, the coupler assembly comprising:
   a unitary annular body extruded to form first and second cylindrical openings for surrounding a pipe or piping sections during use;
   the unitary annular body comprises a medial portion and first and second longitudinal portions integrally extruded in opposite ends of the medial portion; and
   extending from the first and second longitudinal portions away from the medial portion are respective first and second flex members having relatively flexible material structure relative to the remaining unitary annular body, allowing for rotational movement about the flex member, the flex member further for securing the coupler assembly to a pipe or piping sections, the flex members transversely oriented radially inward through a first region then expanding radially outward through a second region wherein said flex members further comprise a first material having a first durometer value and said medial portion and longitudinal portions having a second material having a second durometer value wherein said second durometer value is higher than said first durometer value.

17. The coupler assembly of claim 16 wherein said first material has a durometer value ranging between 40 and 60 on a shore A scale and said second material has a durometer value ranging between 35 and 50 on a shore D scale.

18. The coupler assembly of claim 16 wherein said flex members, said medial portion, and longitudinal portion have substantially the same material thickness.

19. A coupler assembly for forming a fluid-tight seal during use with a pipe or piping sections, the coupler assembly comprising:
- a unitary annular body extruded to form first and second cylindrical openings for surrounding a pipe or piping sections during use;
- the unitary annular body comprises a medial portion and first and second longitudinal portions integrally extruded in opposite ends of the medial portion; and
- extending from the first and second longitudinal portions away from the medial portion are respective first and second flex members having relatively flexible material structure relative to the remaining unitary annular body, allowing for rotational movement about the flex member, the flex member further for securing the coupler assembly to a pipe or piping sections, the flex members transversely oriented radially inward through a first region then expanding radially outward through a second region wherein said medial section further comprises a riser located between and radially projecting opposite first and second stops.

* * * * *